United States Patent
Bala

(10) Patent No.: US 10,673,340 B2
(45) Date of Patent: Jun. 2, 2020

(54) ISOLATED BOOST-BUCK POWER CONVERTER

(71) Applicant: ABB Schweiz AG, Baden (CH)

(72) Inventor: Sandeep Bala, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 400 days.

(21) Appl. No.: 15/814,465

(22) Filed: Nov. 16, 2017

(65) Prior Publication Data
US 2019/0149053 A1 May 16, 2019

(51) Int. Cl.
*H02M 3/335* (2006.01)
*H02M 1/42* (2007.01)
*H02M 7/48* (2007.01)
*H02M 3/337* (2006.01)
*H02M 1/00* (2006.01)
*H02M 1/12* (2006.01)

(52) U.S. Cl.
CPC ..... *H02M 3/33569* (2013.01); *H02M 1/4258* (2013.01); *H02M 3/3376* (2013.01); *H02M 7/4807* (2013.01); *H02J 2207/20* (2020.01); *H02M 1/126* (2013.01); *H02M 2001/0003* (2013.01); *H02M 2001/0048* (2013.01); *H02M 2001/0058* (2013.01); *H02M 2001/0064* (2013.01)

(58) Field of Classification Search
CPC ........... H02M 3/33569; H02M 3/3376; H02M 7/4807; H02M 1/4258; H02M 1/126; H02M 2001/0058; H02M 2001/0003; H02M 2001/0048; H02M 2001/0064; H02J 2207/20; H02J 7/022

USPC ................................................. 320/107, 140
See application file for complete search history.

(56) References Cited

U.S. PATENT DOCUMENTS 5,432,409 A * 7/1995 Nilssen ............. H02M 7/53832
                                                      315/209 R
7,561,446 B1 * 7/2009 Vinciarelli ............. H02M 1/34
                                                        363/16

(Continued)

FOREIGN PATENT DOCUMENTS

WO      2014082661 A1    6/2014

OTHER PUBLICATIONS

International Searching Authority, Search Report and Written Opinion in corresponding Application No. PCT/US2018/061580, dated Jan. 16, 2019, 13 pp.

(Continued)

*Primary Examiner* — M Baye Diao
(74) *Attorney, Agent, or Firm* — J. Bruce Schelkopf; Taft Stettinius & Hollister LLP

(57) ABSTRACT

Unique systems, methods, techniques and apparatuses of an exemplary power converter are disclosed. One exemplary embodiment is a power converter comprising a power cell and a transformer. The power cell including a first and second DC input terminal, a first leg including a first and second switching device coupled and a first AC output terminal, a second leg including a third and fourth switching device and a second AC output terminal. The first and second AC output terminals are coupled to the AC power source and structured to receive an AC power from the AC power source. The transformer includes a primary winding, the primary winding being coupled across the first AC output terminal and the second AC output terminal.

24 Claims, 6 Drawing Sheets

(56) References Cited

U.S. PATENT DOCUMENTS

| | | | |
|---|---|---|---|
| 8,625,311 B2* | 1/2014 | Hosotani | H02M 3/3376 |
| | | | 363/21.03 |
| 9,419,510 B2* | 8/2016 | Liu | H02M 1/08 |
| 9,658,638 B2* | 5/2017 | Athalye | G05F 5/00 |
| 9,705,411 B2* | 7/2017 | Jang | H02M 3/1582 |
| 10,211,719 B2* | 2/2019 | Tanaka | H02M 3/155 |
| 2003/0205990 A1* | 11/2003 | Wittenbreder, Jr. | H02M 1/34 |
| | | | 323/222 |
| 2005/0219879 A1 | 10/2005 | Bixel | |
| 2012/0293126 A1 | 11/2012 | Nakamoto et al. | |
| 2013/0026836 A1 | 1/2013 | Dighrasker et al. | |
| 2013/0128644 A1* | 5/2013 | Temesi | H02M 7/219 |
| | | | 363/132 |
| 2014/0126262 A1* | 5/2014 | Lu | H02M 1/36 |
| | | | 363/131 |
| 2014/0355319 A1 | 12/2014 | Cohen | |
| 2015/0062974 A1 | 3/2015 | Lund et al. | |
| 2015/0098251 A1 | 4/2015 | Harrison | |
| 2015/0115289 A1 | 4/2015 | Fursin et al. | |
| 2015/0214840 A1 | 7/2015 | Acharya et al. | |
| 2019/0181760 A1* | 6/2019 | Choi | H02M 3/1582 |

OTHER PUBLICATIONS

Tetsuzo Ueda; GaN Gate Injection Transistor for Energy-Efficient Power Electronics—Status and Challenge; Mar. 19, 2015; Applied Power Electronics Conference and Exposition (APEC); IS14-4; 23 pgs.

Zhengyang Liu et al.; Design and Evaluation of GaN-Based Dual-Phase Interleaved MHz Critical Mode PFC Converter; Nov. 13, 2014; 6 pgs.; IEEE; Piscataway, New Jersey.

Juncheng Lu et al.; An Indirect Matrix Converter based 97%-efficiency On-board Level 2 Battery Charger Using E-mode GaN HEMTs; Nov. 2, 2015; 8 pgs. IEEE; Piscataway, New Jersey.

Dong Cao et al.; Low Cost Transformer Isolated Boost Half-bridge Micro-inverter for Single-phase Grid-connected Photovoltaic System; Mar. 9, 2012; 8 pgs.; IEEE; Piscataway, New Jersey.

* cited by examiner

US 10,673,340 B2

ISOLATED BOOST-BUCK POWER CONVERTER

BACKGROUND

The present disclosure relates generally to power converters. For charging applications, power converters frequently receive power from an alternating current (AC) power source and convert the AC power to direct current (DC) power effective to charge a load such as a battery or other energy storage device. In order to galvanically isolate the load from the power source, a transformer is coupled between the load and power source. Existing power converters suffer from a number of shortcomings and disadvantages. There remain unmet needs including reducing power converter complexity, increasing power converter reliability, and reducing power converter losses. For instance, some power converters receive AC power, convert all the AC power to DC power with an AC/DC converter, and then convert the DC power to high frequency AC with a DC/AC converter effective to reduce transformer size. Converting all the input AC power to DC power and back to AC produces switching losses during each conversion. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for isolated boost-buck power converters. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
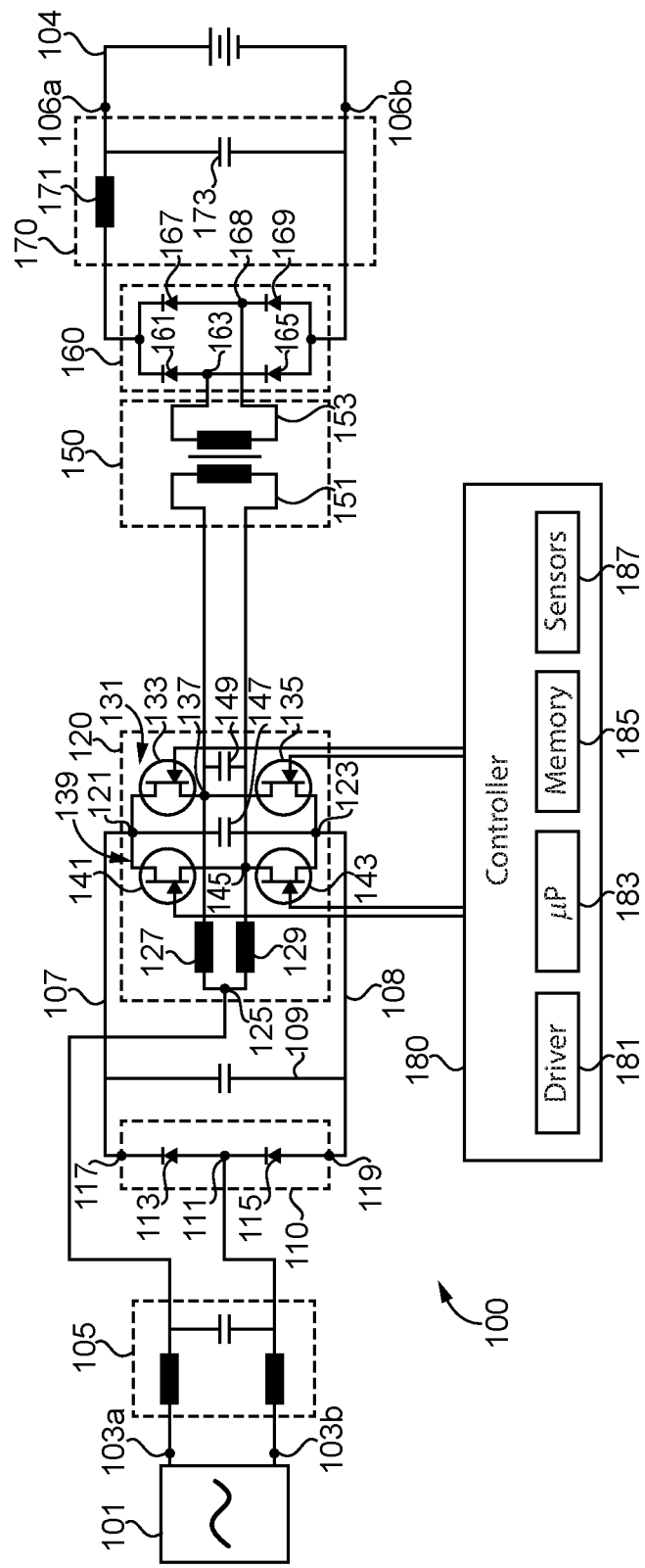
FIG. 1 is a circuit diagram illustrating an exemplary power converter.

With reference to FIG. 1 there is illustrated an exemplary power converter 100. It shall be appreciated that converter 100 may be implemented in a variety of applications, including electric vehicle charging, hybrid electric vehicle charging, and other types of battery charging, to name but a few examples.

Power converter 100 is coupled to an alternating current (AC) power source 101 by way of AC input terminals 103a and 103b. AC power source 101 may be a utility grid, a distributed energy resource such as a generator, a DC power source coupled to a DC/AC converter, or any other device or system structured output AC power. Power converter 100 is structured to receive AC power from power source 101. In certain embodiments, AC power from power source 101 has a low fundamental frequency, such as 50 Hz or 60 Hz, and has an RMS voltage of 230V. In certain embodiments, where AC power source 101 is a multiphase power source, each phase of AC power from power source 101 may have a nominal RMS voltage of 277V.

In the illustrated embodiment, power converter 100 includes an input filter 105 structured to reduce harmonic distortion generated from the operation of power converter 100. Filter 105 includes an inductor coupled to terminal 103a, an inductor coupled to terminal 103b, and a capacitor coupled across terminals 103a and 103b. In other embodiments, converter 100 does not include filter 105.

Converter 100 includes a totem pole 110 structured to receive AC power from AC power source 101, convert the AC power to direct current (DC) power, and output the converted DC power. Totem pole 110 includes semiconductor devices 113 and 115 coupled in series at an AC input terminal 111. Semiconductor device 113 is coupled to a positive DC output terminal 117, and semiconductor device 115 is coupled to a negative DC output terminal 119. Totem pole 110 receives AC power from terminal 103b at AC input terminal 111, converts the AC power to DC power using semiconductor devices 113 and 115, and outputs the DC power to DC output terminals 117 and 119.

In the illustrated embodiment semiconductor devices 113 and 115 are diodes. In other embodiments, semiconductor devices 113 and 115 may be switching devices. For example, a switching device may be an insulated gate bipolar transistors (IGBTs), bipolar junction transistors (BJTs), metal oxide semiconductor field effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, GaN high-electron mobility transistors (HEMTs), or any other type of switch structured to selectively control the flow of electric current. The switching devices may operate with a switching frequency equal to the frequency of the AC power received from power source 101. It shall be appreciated that as the switching frequency of switching devices increase, the sizes of the passive components in power converter 100 may be reduced. Each switching device may be coupled in an anti-parallel configuration with a freewheeling diode. It shall be appreciated that the foregoing features described with respect to a switching device may be present in other switching devices of converter 100 unless otherwise stated.

Converter 100 includes a positive DC bus rail 107 and a negative DC bus rail 108. Totem pole 110 is coupled across the DC bus such that positive DC output terminal 117 is coupled to DC bus rail 107 and negative DC output terminal 119 is coupled to negative DC bus rail 108.

Converter 100 includes a capacitor 109 coupled across rail 107 and rail 108. Capacitor 109 structured to reduce DC ripple of the DC power output by totem pole 110. In certain embodiments, converter 100 includes additional capacitive elements coupled across the DC bus. In certain embodiments, converter 100 does not include capacitor 109.

Converter 100 includes a power cell 120 coupled to positive DC bus rail 107, negative DC bus rail 108, and AC input terminal 103*a*. Power cell 120 is structured to receive AC power with a low fundamental frequency from AC power source 101 at AC input terminal 125, receive DC power from rails 107 and 108, and output AC power with a high fundamental frequency to transformer 150. For example, the high fundamental frequency may be greater than 10 kHz. The AC power output to transformer 150 has a different voltage magnitude compared to the voltage magnitude of the AC power received from terminal 103*a*.

Power cell 120 includes a positive DC input terminal 121 coupled to rail 107, a negative DC input terminal 123 coupled to rail 108 and legs 139 and 131 coupled to terminals 121 and 123. Leg 139, also known as a half-bridge or a totem pole, includes switching device 141 and switching device 143 coupled in series at an AC output terminal 145. Switching device 141 is coupled to positive DC input terminal 121, and switching device 143 is coupled to negative DC input terminal 123.

Leg 131 includes switching device 133 and switching device 135 coupled in series at an AC output terminal 137. Switching device 133 is coupled to positive DC input terminal 121, and switching device 135 is coupled to a negative DC input terminal 123. In certain embodiments, the switching devices of power cell 120 are wide bandgap semiconductor switches, such as GaN switches or SiC switches, structured to operate in a switching frequency range of 10 kHz to 200 kHz.

Power cell 120 includes a capacitive element 147 coupled across positive DC input terminal 121 and negative DC input terminal 123. In the illustrated embodiment, capacitive element 147 is a capacitor. Capacitive element 147 may also be a plurality of capacitors or other types of capacitive elements.

Power cell 120 includes resonant capacitive element 149 coupled across AC output terminal 137 and AC output terminal 145. In the illustrated embodiment, capacitive element 149 is a capacitor. Capacitive element 149 may also be a plurality of capacitors or other capacitive elements. Resonant capacitive element 149 is structured to allow legs 139 and 131 to operate in a soft-switching mode, where operation of power cell 120 achieves resonance or quasi-resonance effective to produce a zero voltage condition or a zero current condition across the switching devices of power cell 120 while toggling. In certain embodiments, power cell 120 does not include resonant capacitive element 149.

Power cell 120 includes an AC input terminal 125 coupled to AC input terminal 103*a*. AC output terminal 137 is coupled to AC input terminal 125 by way of a filter 127 and structured to receive AC power with low fundamental frequency from AC power source 101 by way of AC input terminal 125 and filter 127. AC output terminal 145 is coupled to AC input terminal 125 by way of a filter 129 and structured to receive AC power with low fundamental frequency from AC power source 101 by way of filter 129 and AC input terminal 125. In the illustrated embodiment, filters 127 and 129 each include an inductor, but the filters may include other components.

Converter 100 includes a transformer 150 including a primary winding 151 and a secondary winding 153. Transformer 150 is structured to galvanically isolate the portion of power converter 100 coupled to primary winding 151 and the portion of power converter 100 coupled to secondary winding 153. Primary winding 151 is coupled across AC output terminals 137 and 145. In certain embodiments, the turns ratio of the primary winding and secondary winding is 1:2. The sizing of transformer is dependent on the switching frequency of the switching devices of power cell 120 and the characteristics of passive components of converter 100, such as the inductance of filter 170. In certain embodiments, transformer 150 is a high frequency transformer. In certain embodiments, primary winding 151 or secondary winding 153 is comprised of bifilar windings effective to cause low leakage inductance.

Converter 100 includes a rectifier 160 coupled to secondary winding 153. Rectifier 160 is structured to receive AC power from secondary winding 153, convert the AC power to DC power, and output the DC power. Rectifier 160 includes semiconductor device 161 and semiconductor device 165 coupled in series at a midpoint connection 163, as well as semiconductor device 167 and semiconductor device 169 coupled at midpoint connection 168. Midpoint connections 163 and 168 are coupled to secondary winding 153. In the illustrated embodiment, the semiconductor devices of rectifier 160 are diodes. In other embodiments, one or more of the semiconductor devices of rectifier 160 may be a switching device, controlled by controller 180.

Rectifier 160 is coupled in parallel to a filter 170 including an inductor 171 and a capacitor 173. Filter 170 is structured to reduce DC ripple in the DC power output by rectifier 160. In certain embodiments, filter 170 includes an additional capacitor coupled between rectifier 160 and inductor 171, forming a CLC filter. In embodiments where filter 170 includes inductor 171, transformer 150 has an inductance value effective to permit low leakage, such as 3 uH. In other embodiments, converter 100 does not include filter 170 and rectifier 160 is directly coupled to load 104. In other embodiments, filter 170 does not include inductor 171 and transformer 150 has an increased inductance value, such as 33 uH.

Load 104 is coupled to filter 170 by way of DC output terminals 106*a* and 106*b*. In the illustrated embodiment, load 104 is a capacitive load, such as a battery or other type of power storage device. For example, load 104 may be a lithium-ion based battery pack for an electric vehicle or hybrid electric vehicle. Load 104 may also be another type of DC load, or an AC load coupled to an DC/AC converter. Power converter 100 is structured to provide DC power to load 104 including a voltage greater than or less than the RMS voltage of the AC power from power source 101. The DC output voltage is controlled by controller 180 and determined by load requirements. For example, where AC power is 230V RMS, DC output voltage across load 104 may range from 50V to 1000V.

Converter 100 includes a controller 180 coupled to switching devices 141, 143, 133, and 135. Controller 180 is structured to turn on and off the switching devices of power cell 120 by transmitting activation signals to each of the switching devices.

Controller 180 includes a gate driver circuit 181, a processing device 183, a memory device 185, and sensing devices 187. Gate driver circuit 181 is structured to output activation signals to each of the switching devices of power cell 120. Processing device 183 is structured to operate a driver circuit 181 using instructions stored in memory on memory device 185 and sensor data received from sensing devices 187. Memory device 185 is a non-transitory computer readable medium. Sensing devices 187 include sensors or other types of devices structured to measure electrical characteristics of converter 100.

As described in more detail below, controller 180 is configured to operate the switching devices of power cell 120 so as to receive DC power from DC input terminals 121 and 123, convert the DC power to AC power, provide the converted AC power to AC output terminals 137 and 145, receive unconverted AC power from power source 101, effectively combining the converted AC power from the switches devices with the unconverted power from AC power source 101. In certain embodiments, controller 180 is structured to interleave the duty cycles of one leg relative to another leg so as to increase or decrease voltage of the AC power output to the transformer. In certain embodiments, controller 180 is also configured to operate the switching devices of cell 120 effective to perform power factor correction or transformer DC current control. It shall be appreciated that any or all of the foregoing features of power converter 100 may also be present in the other power converters disclosed herein, such as the power converters of FIGS. 6-7.

Figure 2:
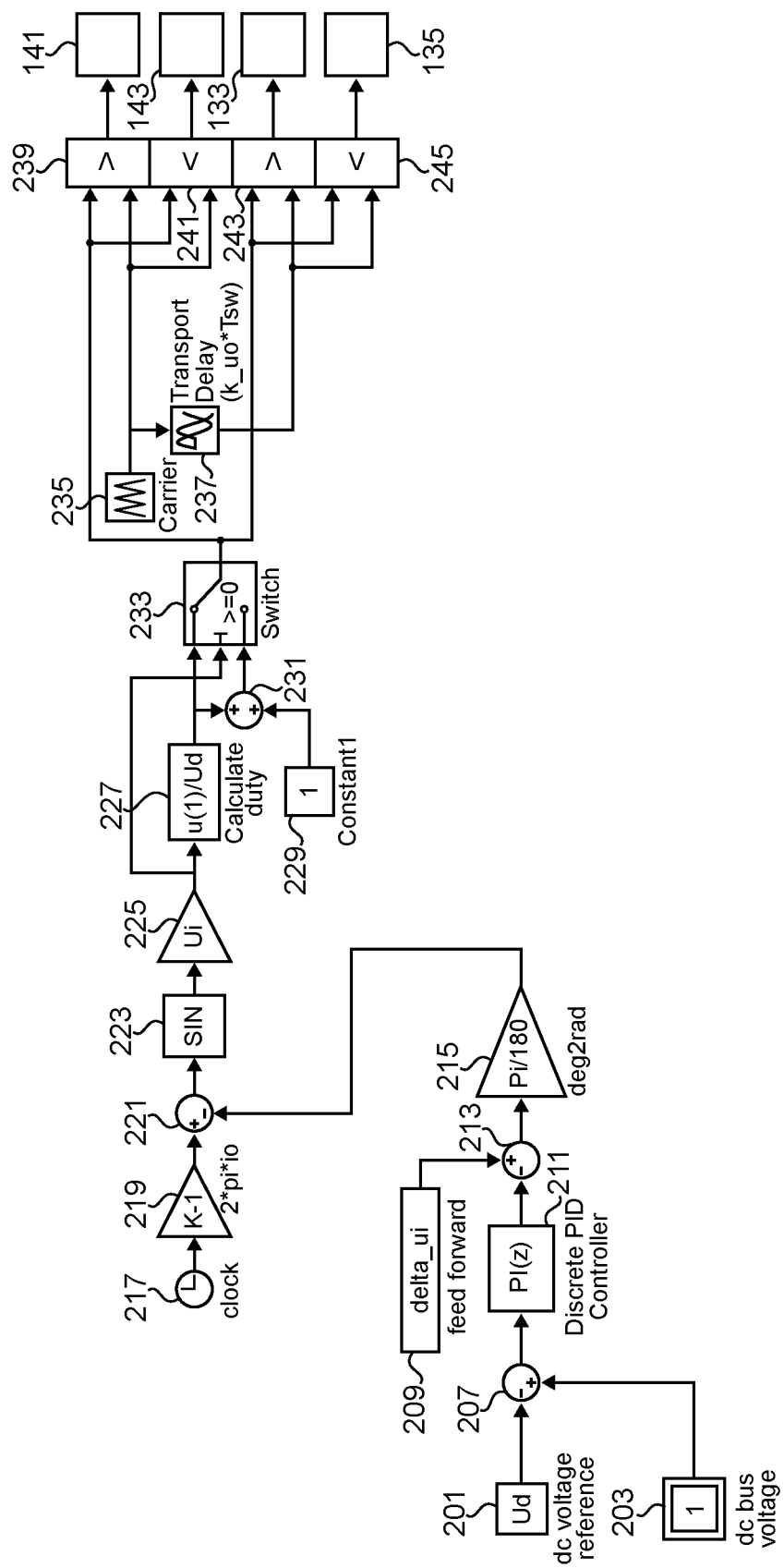
FIG. 2 is a schematic block diagram illustrating an exemplary controller process for operating the exemplary power converter in FIG. 1.

With reference to FIG. 2, there is a schematic block diagram 200 illustrating an exemplary process for generating activation signals for each of the switching devices of power cell 120 by controller 180 in FIG. 1. Instructions for implementing the illustrated process are stored in memory device 185 and executed by processing device 183. It shall be further appreciated that a number of variations and modifications to the schematic block diagram are contemplated including, for example, the omission of one or more aspects of block diagram 200, the modification of the block diagram order, the addition of further blocks and/or the reorganization or separation of blocks into separate blocks.

Block diagram 200 includes an operator 207 structured to receive a DC voltage reference value 201 and a DC bus voltage measurement 203. Measurement 203 corresponds to the voltage across rails 107 and 108. Operator 207 is structured to calculate the difference between the DC voltage reference value and the DC bus voltage measurement. Discrete PID controller 211 receives the calculated value from operator 207, calculates a duty cycle correction effective to reduce the value calculated by operator 207, and outputs a value to operator 213. Operator 213 is structured to add the output value from PID controller 211 and an estimated difference in DC bus value 209, and output the calculated value.

Operator 215 is structured to receive the calculated value from operator 213, and convert the calculated value from degrees to radians. Operator 221 is structured to receive the calculated value from operator 215. Operator 219 is structured to receive a time value from clock 217, and multiply the time value by 2 times pi times the frequency of the AC power from power source 101 in order to calculate the phase angle in radians.

Operator 221 is structured to determine the difference between a calculated value from operator 215 and a calculated value from operator 219. Operator 223 is structured to receive the calculated value from operator 221, and calculate the sine of the value received from operator 221. Operator 225 is structured to receive a value from Operator 223, multiply the value by the nominal RMS voltage of the AC power received from AC power source 101, and output the calculated value. Operator 227 receives the value calculated by operator 225, and divide the value received value by the nominal DC voltage effective to scale the input value.

Operator 231 receives a constant 229 and a value calculated with operator 227, and outputs the combination of constant 229 and the value calculated with operator 227. Operator 223 receives values from operator 225, operator 227, and operator 231. Using unipolar logic and the received values, switch 233 is structured to generate a PWM modulating signal. Carrier generator 235 is structured to generate a PWM carrier signal, such as a triangular wave or saw tooth wave. Switch 233 and carrier generator 234 are structured to output their respective generated signals to comparators 239 and 241. Switch 233 also outputs the PWM modulating signal to comparators 243 and 245. Carrier generator 235 outputs the carrier signal to interleave calculation block 237. Relative to the carrier signal received by comparators 239 and 241, block 237 is structured to delay the carrier signal effective to adjust the output voltage of power cell 120 and reduce the difference between DC voltage reference value 201 and DC bus voltage measurement 203. The length of the delay may be calculated by multiplying the switching period Tsw by a fraction k_uo ranging from 0 to 0.5, where the power to load 104 is increased by increasing the value of k_uo toward 0.5.

Each comparator is structured to output a high voltage or a low voltage based on the received carrier signal and modulating signal. The output of each comparator toggles when the magnitude of one received signal surpasses the magnitude of the other received signal. Each comparator outputs a signal corresponding to an activation signal transmitted to one of the switching devices of power cell 120. Comparators 239 and 241 correspond to activation signals for one leg and comparators 243 and 245 correspond to activation signals for the other leg. For example, comparator 239 corresponds to switching device 141, comparator 241 corresponds to switching device 143, comparator 243 corresponds to switching device 133, and comparator 245 correspond to switching device 135.

Figure 3:
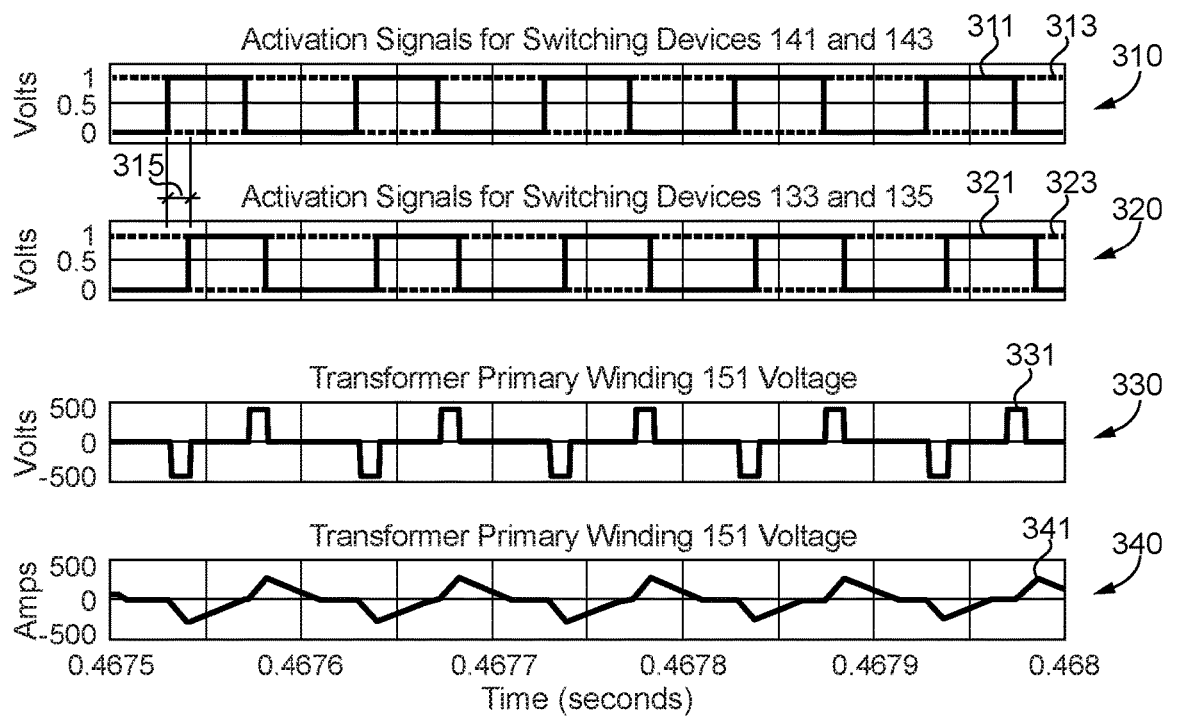
FIG. 3 is a plurality of graphs illustrating output voltage control of the exemplary power converter in FIG. 1.
Figure 3:
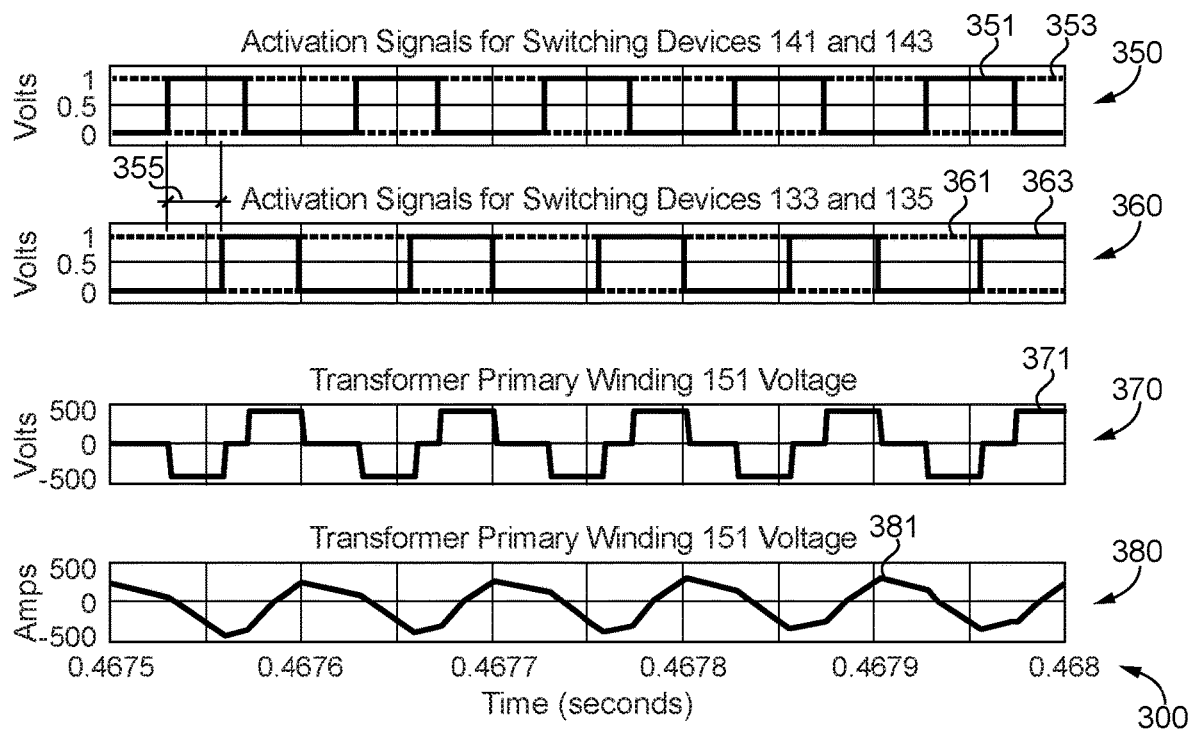

With reference to FIG. 3, there is a plurality of graphs 300 illustrating changes in output due to interleaving of the switching devices of power cell 120. Graphs 310, 320, 330, and 340 represent operation of converter 100 during a first time period and graphs 350, 360, 370, and 380 represent operation of converter 100 during a second time period.

Graph 310 illustrates activation signals transmitted by driver circuit 181 to switching devices 141 and 143 of power cell 120. Graph 310 includes line 311 representing the activation signal transmitted to switching device 141 and line 313 representing the activation signal transmitted to switching device 143. In certain embodiments, when the switching devices of converter 100 receive a low signal, as illustrated by the 0V portion of the activations signals, the switching device is opened, also referred to as turned off. When the switching devices of converter 100 receive a high signal, as illustrated by the 1V portion of the activation signals, the switching device is closed, also referred to as turned on.

Graph 320 illustrates activation signals transmitted by driver circuit 181 to switching devices 133 and 135 of power cell 120. Graph 320 includes line 321 representing the activation signal transmitted to switching device 133 and line 323 representing the activation signal transmitted to switching device 135. As illustrated in graphs 310 and 320, controller 180 interleaves switching devices of one leg relative to the switching devices of the other leg, as represented by line 315. The time delay, also referred to as an interleaving shift, is one way controller 180 controls the output voltage of power cell 120.

Graph 330 illustrates the voltage across primary winding 151 of transformer 150 as a result of the switching operations illustrated in graphs 310 and 320. Graph 330 includes a line 331 representing the voltage across primary winding 151. Graph 340 illustrates the current flowing through primary winding 151 as a result of the switching operations illustrated in graphs 310 at 320. Graph 340 includes a line 341 representing current through primary winding 151.

Graph 350 illustrates activation signals transmitted by driver circuit 181 to switching devices 141 and 143 of power cell 120. Graph 350 includes line 351 representing the activation signal transmitted to switching device 141 and line 353 representing the activation signal transmitted to switching device 143.

Graph 360 illustrates activation signals transmitted by driver circuit 181 to switching devices 133 and 135 of power cell 120. Graph 360 includes line 361 representing the activation signal transmitted to switching device 133 and line 363 representing the activation signal transmitted to switching device 135. As illustrated in graphs 350 and 360, controller 180 interleaves switching devices of one leg relative to the switching devices of the other leg, as represented by line 355.

Graph 370 illustrates the voltage across primary winding 151 of transformer 150 as a result of the switching operations illustrated in graphs 350 and 360. Graph 370 includes a line 371 representing the voltage across primary winding 151. It is important to note the difference in voltage across primary winding 151 illustrated by graphs 330 and 370. As controller 180 increases the interleaving shift of the activation signals transmitted to the switching devices of power cell 120, the output voltage of the power cell increases. Controller 180 may shift the activation signals for one leg of power cell 120 in a range between and including 0° and 180°. As the interleaving shift approaches 180°, output voltage increases.

Graph 380 illustrates the current flowing through primary winding 151 as a result of the switching operations illustrated in graphs 350 at 360. Graph 380 includes a line 381 representing current through primary winding 151.

Figure 4:
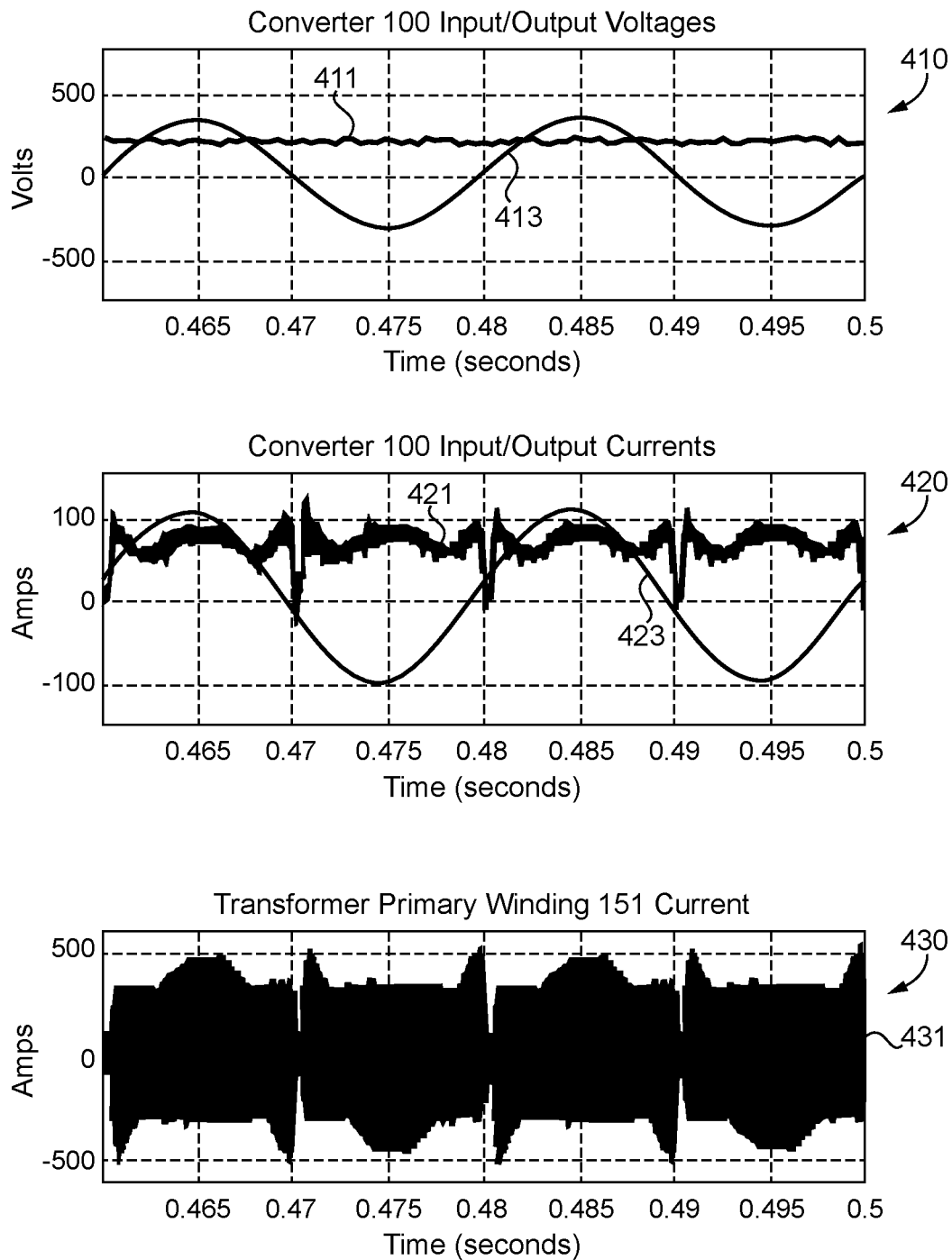
FIGS. 4-5 are graphs illustrating electrical characteristics of exemplary power converter operation.

With reference to FIG. 4, there is a plurality of graphs 400 illustrating electrical characteristics of one embodiment of power converter 100 wherein filter 170 includes inductor 171. The plurality of graphs 400 includes graphs 410, 420, and 430.

Graph 410 illustrates input and output voltages of converter 100. Graph 410 includes a line 411 representing DC output voltage across load 104. Graph 410 also includes a line 413 representing voltage of the AC power received from AC power source 101.

Graph 420 illustrates input and output currents of converter 100 during operation. Graph 420 includes line 421 representing DC current output flowing through load 104. Graph 420 also includes line 423 representing current of AC power received from AC power source 101. It is important to note variation of the DC output current may be reduced for exemplary power converters by using multiphase power from a multiphase power source, such as the embodiments described in FIGS. 6 and 7 below. Thus, an exemplary multiphase power converter may include reduced passive components effective to reduce energy storage of the power converter.

Graph 430 illustrates current through primary winding 151 of transformer 150. Graph 430 includes a line 431 representing current magnitude flowing through primary winding 151.

Figure 5:
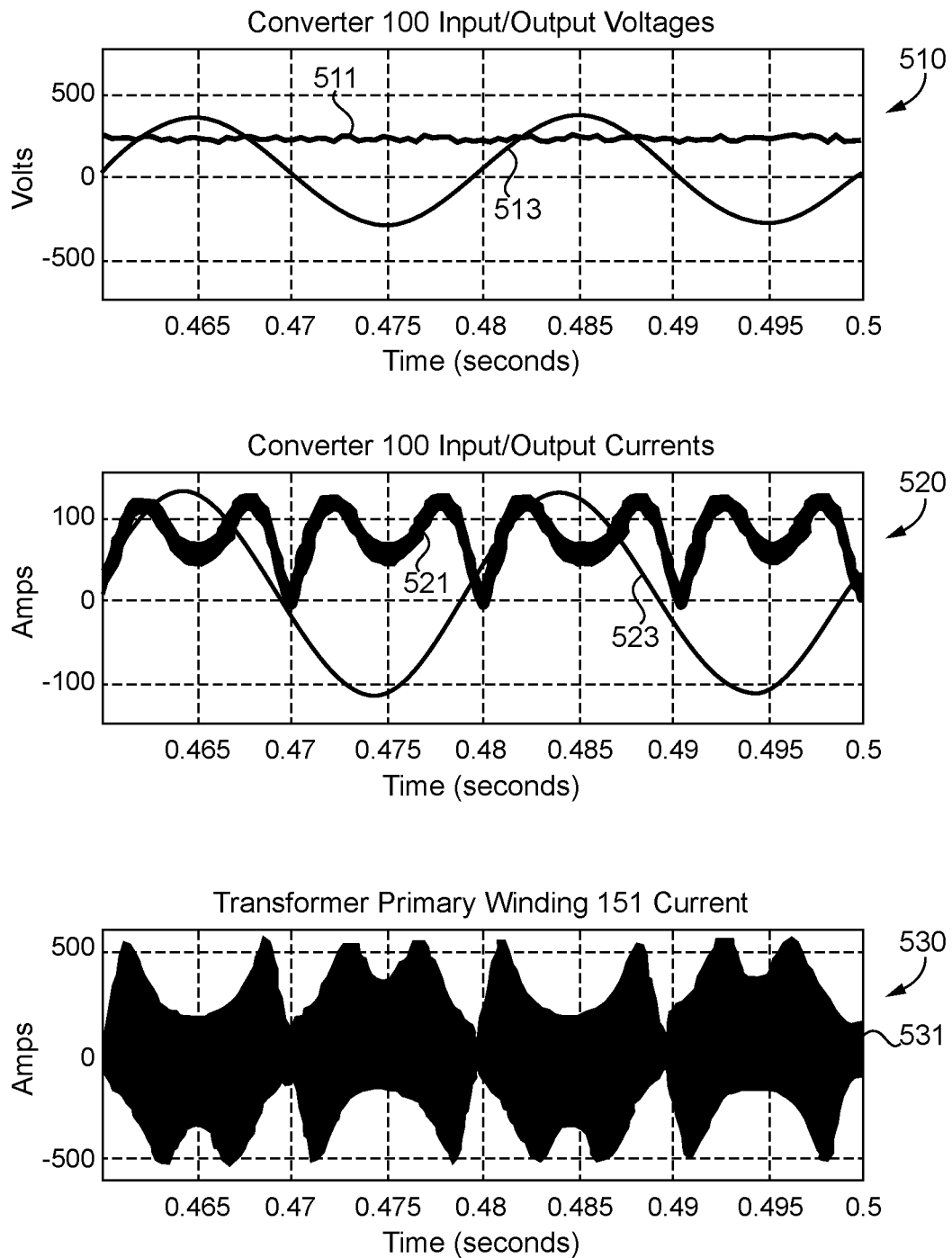

With reference to FIG. 5, there is a plurality of graphs 500 illustrating electrical characteristics of one embodiment of power converter 100 wherein filter 170 does not include inductor 171. The plurality of graphs 500 includes graphs 510, 520, and 530.

Graph 510 illustrates input and output voltages of converter 100. Graph 510 includes a line 511 representing DC output voltage across load 104. Graph 510 also includes a line 513 representing voltage of the AC power received from AC power source 101.

Graph 520 illustrates input and output currents of converter 100 during operation. Graph 520 includes line 521 representing DC current output flowing through load 104. Graph five returned 20 also includes line 523 representing current of AC power received from AC power source 101.

Graph 530 illustrates current through primary winding 151 of transformer 150. Graph 530 includes a line 531 representing current magnitude flowing through primary winding 151.

Figure 6:
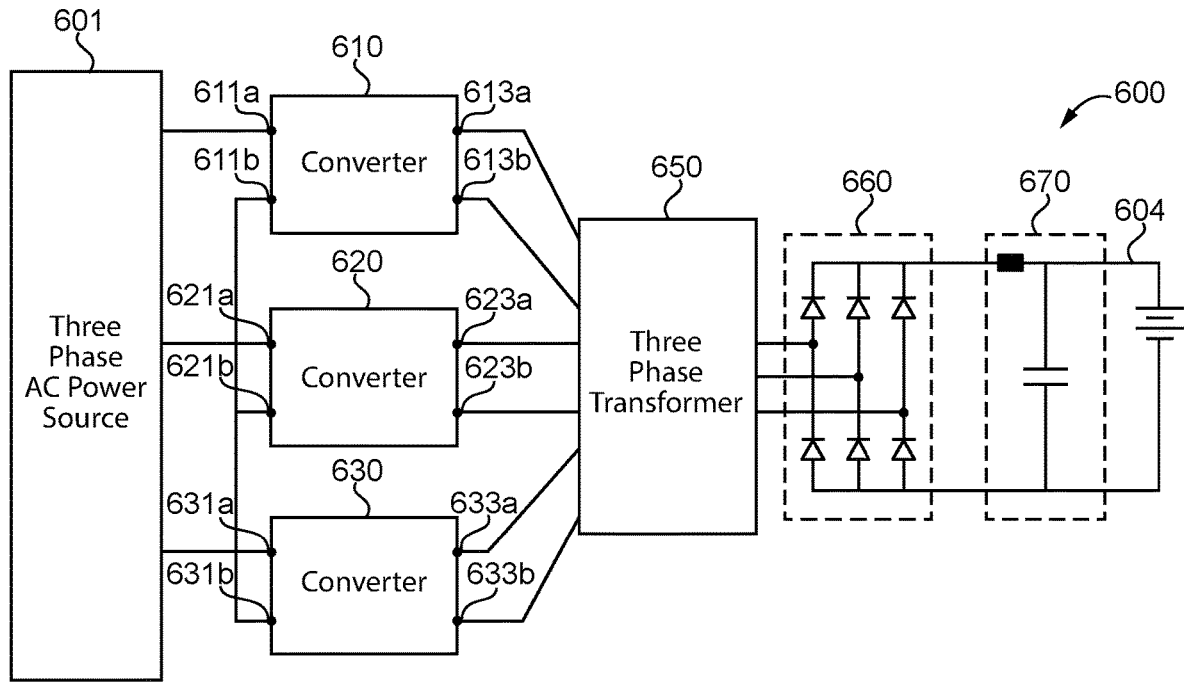
FIGS. 6-7 illustrate exemplary multi-phase power converters.

With reference to FIG. 6, there is illustrated an exemplary AC/DC power converter 600 including AC/AC power converter 610, AC/AC power converter 620, and AC/AC power converter 630, each structured to receive one phase of AC power from multiphase power source 601, the AC power from power source 601 having a first fundamental frequency, and convert the received AC power to AC power with a second, higher fundamental frequency. In other embodiments, converter 600 receives power from another multiphase power source having a different number of phases wherein each phase is received by one AC/AC converter such as converter 610.

Converter 610 includes AC input terminal 611a coupled to power source 601 and AC input terminal 611b coupled to converters 620 and 630. Converter 610 includes AC output terminals 613a and 613b. The topology of converter 610 corresponds to a portion of converter 100 in FIG. 1. Specifically, AC input terminal 611a corresponds to AC input terminal 103a of converter 100; AC input terminal 611b corresponds to AC input terminal 103b of converter 100; and AC output terminals 613a, 613b correspond to AC output terminals 137 and 145 of converter 100. The topology of converter 610 corresponds to the portion of converter 100 between AC input terminals 103a, 103b, and AC output terminals 137, 145.

Converter 620 includes AC input terminal 621a coupled to power source 601 and AC input terminal 621b coupled to AC input terminal 611b and converter 630. Converter 620 includes AC output terminals 623a and 623b. The topology of converter 620 corresponds to a portion of converter 100 in FIG. 1. Specifically, AC input terminal 621a corresponds to AC input terminal 103a of converter 100; AC input terminal 621b corresponds to AC input terminal 103b of converter 100; and AC output terminals 623a, 623b correspond to AC output terminals 137 and 145 of converter 100. The topology of converter 620 corresponds to the portion of converter 100 between AC input terminals 103a, 103b, and AC output terminals 137, 145.

Converter 630 includes AC input terminal 631a coupled to power source 601 and AC input terminal 631b coupled to AC input terminals 611b and 621b. Converter 630 includes AC output terminals 633a and 633b. The topology of converter 630 corresponds to a portion of converter 100 in FIG. 1. Specifically, AC input terminal 631a corresponds to AC input terminal 103a of converter 100; AC input terminal 631b corresponds to AC input terminal 103b of converter 100; and AC output terminals 633a, 633b correspond to AC output terminals 137 and 145 of converter 100. The topology of converter 630 corresponds to the portion of converter 100 between AC input terminals 103a, 103b, and AC output terminals 137, 145.

AC/DC converter 600 includes a three phase transformer 650 coupled to the AC output terminals of AC/AC converters 610, 620, and 630. Transformer 650 is coupled to rectifier 660 and structured to receive AC power from the AC/AC converters and transmit the AC power to rectifier 660. Rectifier 660 is coupled to a DC load 604 by way of a filter 670.

Figure 7:
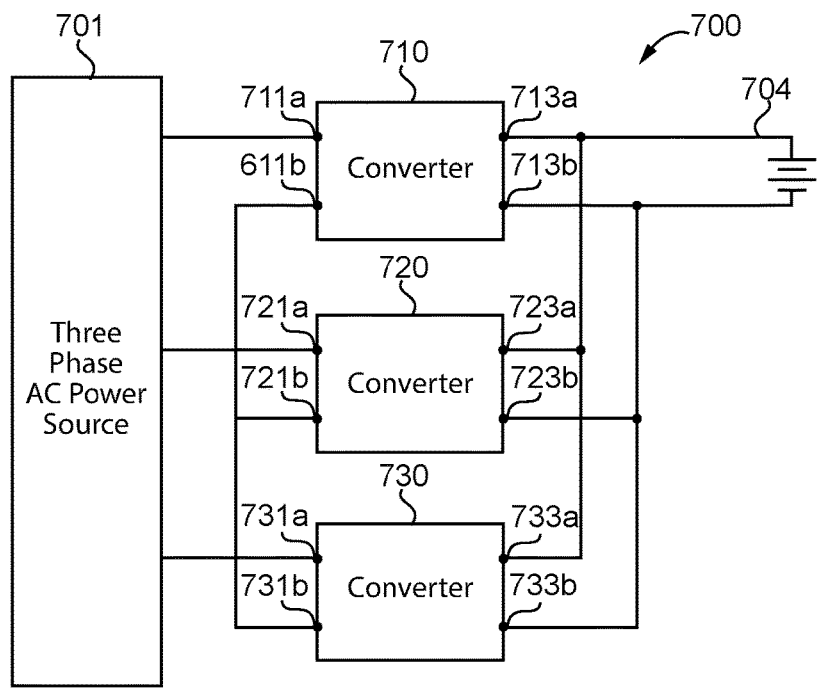

With reference to FIG. 7, there is illustrated an exemplary multiphase AC/DC power converter 700 including single phase AC/DC power converter 710, single phase AC/DC power converter 720, and single phase AC/DC power converter 730, each structured to receive one phase of AC power from multiphase power source 701, convert the received AC power to DC power, and output the DC power to DC load 704.

Converter 710 includes AC input terminal 711a coupled to power source 701 and AC input terminal 711b coupled to converters 720 and 730. Converter 710 includes DC output terminals 713a and 713b. The topology of converter 710 corresponds to the topology of converter 100 in FIG. 1. Specifically, AC input terminal 711a corresponds to AC input terminal 103a of converter 100; AC input terminal 711b corresponds to AC input terminal 103b of converter 100; and DC output terminals 713a, 713b correspond to DC output terminals 106a and 106b of converter 100.

Converter 720 includes AC input terminal 721a coupled to power source 701 and AC input terminal 721b coupled to AC input terminal 711b and converter 730. Converter 720 includes DC output terminals 723a and 723b. The topology of converter 720 corresponds to the topology of converter 100 in FIG. 1. Specifically, AC input terminal 721a corresponds to AC input terminal 103a of converter 100; AC input terminal 721b corresponds to AC input terminal 103b of converter 100; and DC output terminals 723a, 723b correspond to DC output terminals 106a and 106b of converter 100.

Converter 730 includes AC input terminal 731a coupled to power source 701 and AC input terminal 731b coupled to AC input terminals 711b and 721b. Converter 730 includes DC output terminals 733a and 733b. The topology of converter 730 corresponds to the topology of converter 100 in FIG. 1. Specifically, AC input terminal 731a corresponds to AC input terminal 103a of converter 100; AC input terminal 731b corresponds to AC input terminal 103b of converter 100; and DC output terminals 733a, 733b correspond to DC output terminals 106a and 106b of converter 100. The output terminals of converters 710, 720, and 730 are coupled in parallel such that DC power from each single phase AC/DC converter is combined and output to DC load 704.

Further written description of a number of exemplary embodiments shall now be provided. One embodiment is a power converter comprising at least one power cell including a first DC input terminal and a second DC input terminal structured to receive DC power, a first leg including a first switching device coupled between the first DC input terminal and a first AC output terminal, and a second switching device coupled between the second DC input terminal and the first AC output terminal, the first AC output terminal being coupled to an AC power source and structured to receive AC power from the AC power source, a second leg including a third switching device coupled between the first DC input terminal and a second AC output terminal, and a fourth switching device coupled between the second DC input terminal and the second AC output terminal, the second AC output terminal being coupled to the AC power source and structured to receive AC power from the AC power source; and a transformer including a primary winding, the primary winding being coupled across the first AC output terminal and the second AC output terminal.

In certain forms of the foregoing power converter, the power converter comprises a controller configured to operate the first switching device, the second switching device, the third switching device, and the fourth switching device so as to receive DC power from the first DC input terminal and the second DC input terminal, convert the DC power to AC power, and provide the converted AC power to the first AC output terminal and the second AC output terminal effective to receive AC power including a first fundamental frequency from the AC power source at the first and second AC output terminals, and effective to transmit AC power including a second fundamental frequency from the first and second AC output terminals to the transformer, wherein the second fundamental frequency is greater than the first fundamental frequency. In certain forms, the controller is structured to interleave the operation of the first and second switching devices with the operation of the third and fourth switching devices so as to increase or decrease voltage of the AC power output to the transformer. In certain forms, the power converter comprises a totem pole including an input terminal, a first DC output terminal, and a DC second output terminal and structured to receive AC power from the AC power source with the input terminal, convert the AC power to DC power, and output the DC power with the first DC output terminal and the second DC output terminal, wherein the first DC input terminal of the power cell is coupled to the first DC output terminal of the totem pole and the second DC input terminal is coupled to the second DC output terminal of the totem pole. In certain forms, the power converter comprises a rectifier, wherein the transformer includes a secondary winding, wherein the rectifier is coupled to the secondary winding and structured to receive power from the secondary winding and convert the power to DC power. In certain forms, at least one of the first switching device, the second switching device, the third switching device, and the fourth switching device include a wide bandgap semiconductor switch. In certain forms, the power converter comprises a capacitive element coupled between the first AC output terminal and the second AC output terminal, and wherein a controller is configured to operate the first switching device, the second switching device, the third switching device, and the fourth switching device in a soft-switching mode using the capacitive element. In certain forms, one or more of the at least one power cell is the only circuitry coupling the transformer with an electrical power source. In certain forms, an output side of the transformer is operatively coupled with a power storage device and the power converter is operable to charge the power storage device. In certain forms, the power storage device comprises a battery having a lithium-based chemistry.

Another exemplary embodiment is a method for operating a power converter comprising operating circuitry including at least one power cell including a first leg including a first switching device and a second switching device coupled at a first AC output terminal, a second leg coupled in parallel to the first leg and including a third switching device and a second switching device coupled at a second AC output terminal, and a transformer coupled to the first AC output terminal and the second AC output terminal, the act of operating including: transmitting a first AC power including a first fundamental frequency from an AC power source to both the first AC output terminal and second AC output terminal; receiving DC power with the first leg and the second leg; converting DC power to a converted AC power; outputting the converted AC power to the first AC output terminal and the second AC output terminal effective to output a second AC power including a second fundamental frequency, wherein the second fundamental frequency is greater than the first fundamental frequency; and receiving the second AC power with the transformer.

In certain forms of the foregoing method, converting the DC power to the converted AC power includes interleaving the operation of the first leg with the operation of the second leg. In certain forms, interleaving the operation of the first leg with the second leg includes calculating an output voltage and determining a time delay between the operation of the first leg and the operation of second leg effective to output the calculated output voltage. In certain forms, the first switching device is structured to operate with a frequency greater than 10 kHz. In certain forms, the method comprises receiving unconverted AC power from the AC power source, converting the AC power to DC power, and providing the DC power to the first and second leg. In certain forms, the method comprises outputting the second AC power from the transformer to a rectifier, converting the second AC power to a second DC power, and outputting the second DC power to a capacitive load. In certain forms, the circuitry includes a plurality of power cells coupled in parallel with a DC bus, wherein the AC power source is a multiphase power source and each power cell is structured to receive one phase of the multiphase power source. In certain forms, transmitting the first AC power from an AC power source to the first AC output terminal includes transmitting the first AC power through a first filter including a first inductor, and transmitting the first AC power from an AC power source to the second AC output terminal includes transmitting the first AC power through a second filter including a second inductor.

A further exemplary embodiment is a boost-buck power converter for charging a capacitive load comprising at least one power cell including a first DC input terminal and a second DC input terminal structured to receive a first DC power; a first leg including a first switching device coupled between the first DC input terminal and a first AC output terminal, and a second switching device coupled between the second DC input terminal and the first AC output terminal, the first AC output terminal being coupled to an AC power source and structured to receive a first AC power from the AC power source, a second leg including a third switching device coupled between the first DC input terminal and a second AC output terminal, and a fourth switching device coupled between the second DC input terminal and the second AC output terminal, the second AC output terminal being coupled to the AC power source and structured to receive the first AC power from the AC power source; a transformer including a primary winding and a secondary winding, the primary winding being coupled across the first AC output terminal and the second AC output terminal; a rectifier coupled to the secondary winding of the transformer structured to receive a second AC power from the secondary winding and convert the second AC power to a second DC power including a DC voltage; and a controller structured to operate the first, second, third, and fourth switching devices effective to control magnitude of the DC voltage, wherein a first fundamental frequency of the first AC power is less than a second fundamental frequency of the second AC power.

In certain forms of the foregoing boost-buck power converter, at least one of the primary winding and the secondary windings comprises bifilar windings. In certain forms, the controller is configured to operate the first switching device, the second switching device, the third switching device, and the fourth switching device so as to receive the first DC power from the first DC input terminal and the second DC input terminal, convert the first DC power to a third AC power, and provide the third AC power to the first AC output terminal and the second AC output terminal effective to transmit the first AC power from the AC power source to both the first and second AC output terminals, and transmit the second AC power to the transformer from the first and second AC output terminals. In certain forms, the controller is structured to interleave the operation of the first and second switching devices with the operation of the third and fourth switching devices so as to increase or decrease voltage of the second AC power output to the transformer. In certain forms, the boost-buck power converter comprises a filter coupled to the rectifier and coupled to the capacitive load, wherein the filter contains a capacitor and an inductor. In certain forms, the boost-buck power converter comprises a DC bus and a plurality of power cells coupled in parallel between the DC bus and the primary winding of the transformer.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A power converter comprising:
  at least one power cell including:
    a first DC input terminal and a second DC input terminal structured to receive DC power,
    a first leg including a first switching device coupled between the first DC input terminal and a first AC output terminal, and a second switching device coupled between the second DC input terminal and the first AC output terminal, the first AC output terminal being coupled to an AC power source and structured to receive AC power from the AC power source,
    a second leg including a third switching device coupled between the first DC input terminal and a second AC output terminal, and a fourth switching device coupled between the second DC input terminal and the second AC output terminal, the second AC output terminal being coupled to the AC power source and structured to receive AC power from the AC power source; and
    a transformer including a primary winding, the primary winding being coupled across the first AC output terminal and the second AC output terminal.

2. The power converter of claim 1 comprising a controller configured to operate the first switching device, the second switching device, the third switching device, and the fourth switching device so as to receive DC power from the first DC input terminal and the second DC input terminal, convert the DC power to AC power, and provide the converted AC power to the first AC output terminal and the second AC output terminal effective to receive AC power including a first fundamental frequency from the AC power source at the first and second AC output terminals, and effective to transmit AC power including a second fundamental frequency from the first and second AC output terminals to the transformer, wherein the second fundamental frequency is greater than the first fundamental frequency.

3. The power converter of claim 2 wherein the controller is structured to interleave the operation of the first and second switching devices with the operation of the third and fourth switching devices so as to increase or decrease voltage of the AC power output to the transformer.

4. The power converter of claim 1 comprising a totem pole including an input terminal, a first DC output terminal, and a DC second output terminal and structured to receive AC power from the AC power source with the input terminal, convert the AC power to DC power, and output the DC power with the first DC output terminal and the second DC output terminal, wherein the first DC input terminal of the power cell is coupled to the first DC output terminal of the totem pole and the second DC input terminal is coupled to the second DC output terminal of the totem pole.

5. The power converter of claim 1 comprising a rectifier, wherein the transformer includes a secondary winding, wherein the rectifier is coupled to the secondary winding and structured to receive power from the secondary winding and convert the power to DC power.

6. The power converter of claim 1 wherein at least one of the first switching device, the second switching device, the third switching device, and the fourth switching device include a wide bandgap semiconductor switch.

7. The power converter of claim 1 comprising a capacitive element coupled between the first AC output terminal and the second AC output terminal, and wherein a controller is configured to operate the first switching device, the second switching device, the third switching device, and the fourth switching device in a soft-switching mode using the capacitive element.

8. The power converter of claim 1 wherein one or more of the at least one power cell is the only circuitry coupling the transformer with an electrical power source.

9. The power converter of claim 1 wherein an output side of the transformer is operatively coupled with a power storage device and the power converter is operable to charge the power storage device.

10. The power converter of claim 9 wherein the power storage device comprises a battery having a lithium-based chemistry.

11. A method for operating a power converter comprising:
  operating circuitry including:
    at least one power cell including:
      a first leg including a first switching device and a second switching device coupled at a first AC output terminal,
      a second leg coupled in parallel to the first leg and including a third switching device and a second switching device coupled at a second AC output terminal, and
      a transformer coupled to the first AC output terminal and the second AC output terminal, the act of operating including:
    transmitting a first AC power including a first fundamental frequency from an AC power source to both the first AC output terminal and second AC output terminal;
    receiving DC power with the first leg and the second leg;
    converting DC power to a converted AC power;
    outputting the converted AC power to the first AC output terminal and the second AC output terminal effective to output a second AC power including a second fundamental frequency, wherein the second fundamental frequency is greater than the first fundamental frequency; and
    receiving the second AC power with the transformer.

12. The method of claim 11 wherein converting the DC power to the converted AC power includes interleaving the operation of the first leg with the operation of the second leg.

13. The method of claim 12 wherein interleaving the operation of the first leg with the second leg includes calculating an output voltage and determining a time delay between the operation of the first leg and the operation of second leg effective to output the calculated output voltage.

14. The method of claim 11 wherein the first switching device is structured to operate with a frequency greater than 10 kHz.

15. The method of claim 11 comprising receiving unconverted AC power from the AC power source, converting the AC power to DC power, and providing the DC power to the first and second leg.

16. The method of claim 11 comprising outputting the second AC power from the transformer to a rectifier, converting the second AC power to a second DC power, and outputting the second DC power to a capacitive load.

17. The method of claim 11 wherein the circuitry includes a plurality of power cells coupled in parallel with a DC bus, wherein the AC power source is a multiphase power source and each power cell is structured to receive one phase of the multiphase power source.

18. The method of claim 11 wherein transmitting the first AC power from an AC power source to the first AC output terminal includes transmitting the first AC power through a first filter including a first inductor, and transmitting the first AC power from an AC power source to the second AC output terminal includes transmitting the first AC power through a second filter including a second inductor.

19. A boost-buck power converter for charging a capacitive load comprising:
    at least one power cell including:
        a first DC input terminal and a second DC input terminal structured to receive a first DC power;
        a first leg including a first switching device coupled between the first DC input terminal and a first AC output terminal; and a second switching device coupled between the second DC input terminal and the first AC output terminal, the first AC output terminal being coupled to an AC power source and structured to receive a first AC power from the AC power source,
        a second leg including a third switching device coupled between the first DC input terminal and a second AC output terminal, and a fourth switching device coupled between the second DC input terminal and the second AC output terminal, the second AC output terminal being coupled to the AC power source and structured to receive the first AC power from the AC power source;
    a transformer including a primary winding and a secondary winding, the primary winding being coupled across the first AC output terminal and the second AC output terminal;
    a rectifier coupled to the secondary winding of the transformer structured to receive a second AC power from the secondary winding and convert the second AC power to a second DC power including a DC voltage; and
    a controller structured to operate the first, second, third, and fourth switching devices effective to control magnitude of the DC voltage,
    wherein a first fundamental frequency of the first AC power is less than a second fundamental frequency of the second AC power.

20. The boost-buck power converter of claim 19 wherein at least one of the primary winding and the secondary windings comprises bifilar windings.

21. The boost-buck power converter of claim 19 wherein the controller is configured to operate the first switching device, the second switching device, the third switching device, and the fourth switching device so as to receive the first DC power from the first DC input terminal and the second DC input terminal, convert the first DC power to a third AC power, and provide the third AC power to the first AC output terminal and the second AC output terminal effective to transmit the first AC power from the AC power source to both the first and second AC output terminals, and transmit the second AC power to the transformer from the first and second AC output terminals.

22. The boost-buck power converter of claim 21 wherein the controller is structured to interleave the operation of the first and second switching devices with the operation of the third and fourth switching devices so as to increase or decrease voltage of the second AC power output to the transformer.

23. The boost-buck power converter of claim 19 comprising a filter coupled to the rectifier and coupled to the capacitive load, wherein the filter contains a capacitor and an inductor.

24. The boost-buck power converter of claim 19 comprising a DC bus and a plurality of power cells coupled in parallel between the DC bus and the primary winding of the transformer.

* * * * *